(12) United States Patent
Li

(10) Patent No.: US 8,494,514 B2
(45) Date of Patent: Jul. 23, 2013

(54) TERMINAL IN DIGITAL TRUNKING COMMUNICATION SYSTEM AND METHOD FOR REALIZING FAST ANSWER THEREOF

(75) Inventor: Sen Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/148,051

(22) PCT Filed: Apr. 16, 2010

(86) PCT No.: PCT/CN2010/071829
§ 371 (c)(1),
(2), (4) Date: Aug. 5, 2011

(87) PCT Pub. No.: WO2010/124559
PCT Pub. Date: Nov. 4, 2010

(65) Prior Publication Data
US 2012/0028616 A1   Feb. 2, 2012

(30) Foreign Application Priority Data

Apr. 30, 2009   (CN) .......................... 2009 1 0138413

(51) Int. Cl.
*H04W 88/02*   (2009.01)
(52) U.S. Cl.
USPC ....................... 455/426.1; 455/411
(58) Field of Classification Search
USPC ....... 455/426.1, 411, 413, 415, 552; 375/133; 380/255; 370/221.03, 395.52; 379/22, 284
See application file for complete search history.

(56) References Cited

U.S. PATENT DOCUMENTS

| | | | |
|---|---|---|---|
| 5,717,830 A * | 2/1998 | Sigler et al. | 455/426.1 |
| 5,913,164 A * | 6/1999 | Pawa et al. | 455/427 |
| 6,112,083 A * | 8/2000 | Sweet et al. | 455/426.1 |

(Continued)

FOREIGN PATENT DOCUMENTS

| | | |
|---|---|---|
| CN | 1585528 A | 2/2005 |
| CN | 101094459 A | 12/2007 |
| CN | 101132563 A | 2/2008 |
| CN | 101540961 A | 9/2009 |

OTHER PUBLICATIONS

International Search Report in international application No. PCT/CN2010/071829, mailed on Jul. 15, 2010.

(Continued)

*Primary Examiner* — Diane Mizrahi
(74) *Attorney, Agent, or Firm* — Oppedahl Patent Law Firm LLC

(57) ABSTRACT

A method for realizing a fast answer of a terminal in a digital trunking communication system comprises: after receiving a channel assignment message signalling from a system side, a main control device of the terminal establishes a service channel, determines a call type, and executes a voice mode flow when the call is a normal voice call, or sends a service interface display message to a control chip of the terminal when the call is a trunking call; and the control chip, according to the service interface display message sent by the main control device, displays a service interface and begins to answer voice information. A terminal in the digital trunking communication system is further provided, which comprises a main control device and a control chip. The terminal in the digital trunking communication system and method for realizing the fast answer thereof adapt to the requirements for a fast access and display of the terminal in the digital trunking communication system and better meet the requirements of the digital trunking users.

6 Claims, 4 Drawing Sheets

U.S. PATENT DOCUMENTS

| | | | | |
|---|---|---|---|---|
| 6,477,370 | B1* | 11/2002 | Sigler et al. | 455/427 |
| 6,529,731 | B2* | 3/2003 | Modzelesky et al. | 455/427 |
| 6,542,739 | B1* | 4/2003 | Garner | 455/427 |
| 6,850,497 | B1* | 2/2005 | Sigler et al. | 370/310 |
| 2001/0012775 | A1* | 8/2001 | Modzelesky et al. | 455/427 |
| 2007/0021132 | A1 | 1/2007 | Jin | |

OTHER PUBLICATIONS

English Translation of the Written Opinion of the International Search Authority in international application No. PCT/CN2010/071829, mailed on Jul. 15, 2010.
Supplementary European Search Report in European application No. 10769248.5, mailed on Mar. 14, 2013.

* cited by examiner

TERMINAL IN DIGITAL TRUNKING COMMUNICATION SYSTEM AND METHOD FOR REALIZING FAST ANSWER THEREOF

TECHNICAL FIELD

The present invention relates to the field of digital trunking communications, and particularly to a terminal in the digital trunking communication system and a method for realizing a fast answer thereof.

BACKGROUND

The digital trunking communication system is an important branch of the mobile communication system and applied for the command communications for group scheduling, such as government department, army, police affairs, railway, water conservancy, civil aviation, steel logistics and other professional mobile communication fields.

FIG. 1 is a schematic diagram showing the internal structure of a terminal in the existing digital trunking communication system. As shown in FIG. 1, the terminal mainly comprises a main control device 1, a peripheral circuit 2, a peripheral control chip 3 and a peripheral device 4.

The main control device 1 is a main control part of the terminal (usually, one terminal only has one main control device) and internally integrated with a CPU and a device for receiving and transmitting external signals, and is the heart of the terminal.

The peripheral circuit 2 is an auxiliary equipment of the terminal, which provides power or storage and interactive environments for the main control device 1 or the peripheral control chip 3; the peripheral circuit 2 has no capability of processing operations generally and is the hardware part of the terminal.

The peripheral control chip 3 (control chip for short) is an auxiliary equipment of the terminal, which has a certain capability of processing operations; the control chip is arranged to assist the main control device 1 to manage the peripheral circuit 2 and peripheral device 4, or process some complex information instead of the main control device 1.

The peripheral device 4 is a peripheral equipment of the terminal, provided with no capability of processing operations; the peripheral devices are peripheral I/O devices, such as Liquid Crystal Display (LCD), Light-Emitting Diode (LED), keyboard, loudspeaker, etc.

The terminal may be a mobile phone, a vehicle mounted radio station or other digital trunking terminals.

The main control device 1 manages the peripheral device 4 by sending an AT instruction to the control chip 3 instead of managing directly the control of display, sound devices, for example, of the peripheral device 4. All the AT instructions start with +, followed by a command name, such as a ring operation (RING), a calling number display (CLIP or INCOMING), a service interface display (ZCCNT), etc.

FIG. 2 is a schematic diagram showing the flow of a terminal answering a normal voice call in the existing digital trunking communication system, and the flow of the terminal answering a trunking call is similar to that of the terminal answering a normal voice call. As shown in FIG. 2, the answer flow of the terminal is as follows.

After receiving a paging message signalling from the system side, the terminal returns a paging response message signalling to the system side, and performs a display for preparing to notify a user in a manner of bright screen, for example. After receiving a channel assignment message signalling from the system side, the terminal waits for a ringing and calling number message signalling; after receiving the ringing and calling number message signalling from the system side, the main control device of the terminal sends a calling number display message (i.e., +CLIP: XXX or +INCOMING: XXX, wherein XXX is the calling number) to the control chip to inform the control chip to display the calling number and waits for an response from the user. The main control device of the terminal receives a user response message from the control chip and sends a user response message signalling to the system side. When the user response message is a positive response message, which means the user answers, the main control device of the terminal then sends a service interface display message (i.e., +ZCCNT:) to the control chip for a service interface display, and starts to answer the voice information from the system side; when the user response message is a negative response message, which means the user rejects answering, the system side then terminates the call, and the main control device of the terminal sends an end call message to the control chip to end this call.

In the technical solutions discussed above, the main control device of the terminal manages the peripheral device by sending the AT instructions to the control chip, in which the AT instructions are transmitted via a serial port with relatively low speed. Therefore, how to optimize the AT instructions between the main control device and the control chip to improve the work efficiency of the terminal, especially during a trunking call, is an important task for optimizing the terminal, even the whole digital trunking system.

SUMMARY

The present invention mainly aims to provide a terminal in a digital trunking communication system and a method for realizing a fast answer thereof, to reduce the time of answering a trunking call by the terminal in the digital trunking communication system.

To achieve the above purposes, the technical solutions of the present invention are realized as follows.

In one aspect, a method for realizing a fast answer of a terminal in a digital trunking communication system is provided. The method comprises that:

after receiving a channel assignment message signalling from a system side, a main control device of the terminal establishes a service channel, determines a call type, and executes a voice mode flow if the call is a normal voice call, or directly sends a service interface display message to a control chip of the terminal if the call is a trunking call; and the control chip according to the service interface display message displays a service interface, answers and plays voice information from the system side.

Further, the main control device may determine the call type according to contents of an assignment mode field in the channel assignment message signalling.

Further, the terminal may be a mobile phone or a vehicle mounted radio station.

In another aspect, a terminal in a digital trunking communication system is provided. The terminal comprises a main control device and a control chip.

The main control device is arranged to, after receiving a channel assignment message signalling from the system side, establish a service channel, and send a service interface display message to the control chip when a call is a trunking call; and the control chip is arranged to, according to the service interface display message, for displaying a service interface, answer and play voice information from the system side.

Further, the terminal may be a mobile phone or a vehicle mounted radio station.

The terminal in the digital trunking communication system and the method for realizing a fast answer thereof of the present invention, by changing and optimizing the interactive mode of the display flow in the process of communication between the main control device and the control chip of the terminal in the digital trunking communication system, reduce the transmission information between the main control device and the control chip. The terminal, after receiving a channel assignment message signalling, answers by default without waiting for a keystroke by a user to answer, thereby reducing the time of answering the trunking call by the user in the digital trunking communication system, which is more adapted to the requirements for a fast access and display of the terminal in the digital trunking communication system and better meeting the requirements of the digital trunking user.

DETAILED DESCRIPTION

The basic idea of the present invention is that: by changing and optimizing the interactive mode of the display flow in the communication process between the main control device and the control chip of the terminal in the digital trunking communication system, transmission information is reduced between the main control device and the control chip when the terminal receives a trunking call; the terminal, after receiving a channel assignment message signalling from the system side, answers by default without waiting for a keystroke by a user to answer, thereby accelerating the access speed of the terminal and realizing a fast answer of the terminal in the digital trunking communication system.

Figure 1:
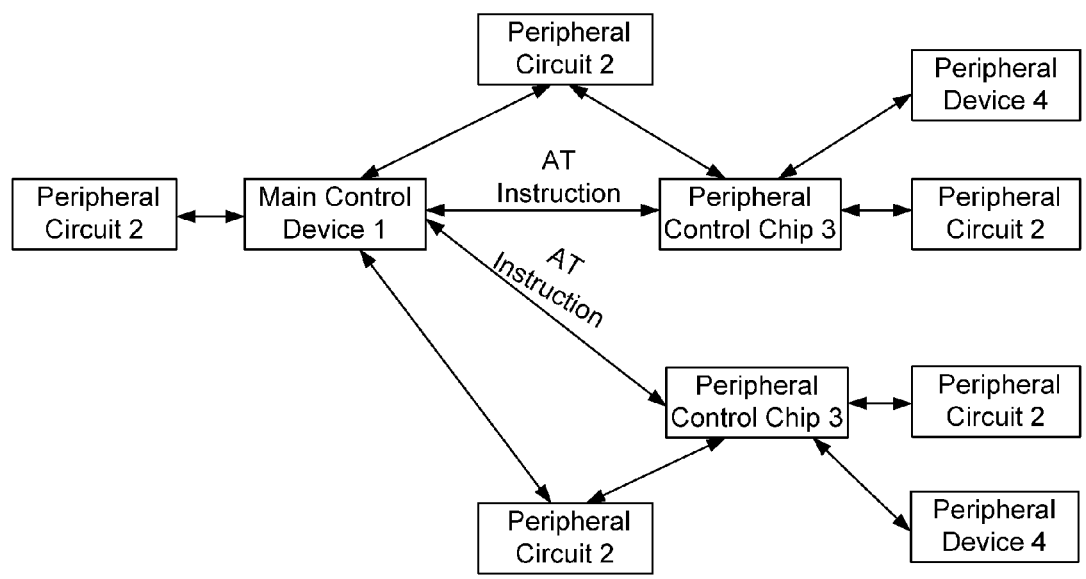
FIG. 1 is a schematic diagram showing the internal structure of a terminal in the existing digital trunking communication system.
Figure 2:
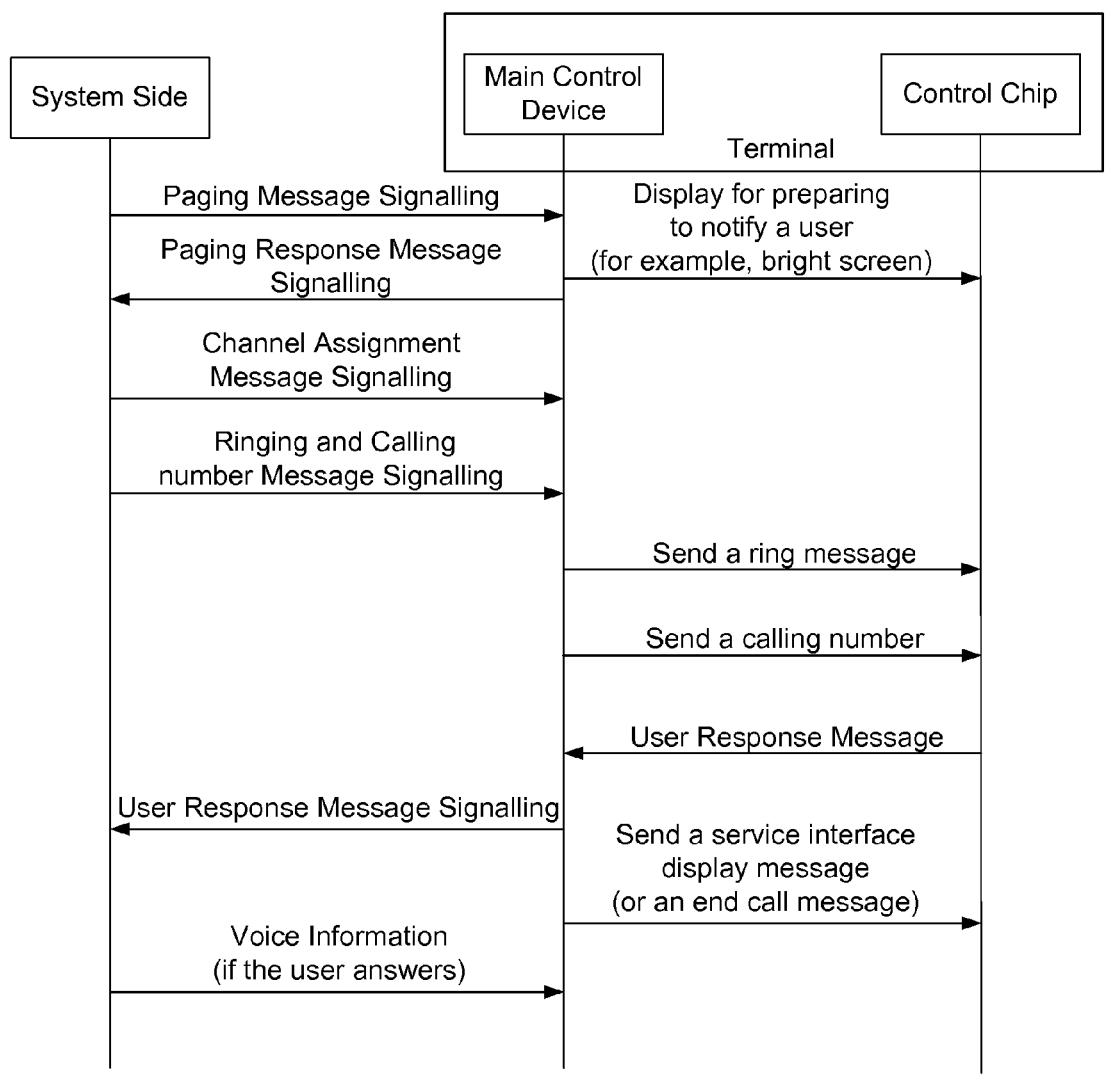
FIG. 2 is a schematic diagram showing the flow of a terminal answering a normal voice call in the existing digital trunking communication system.
Figure 3:
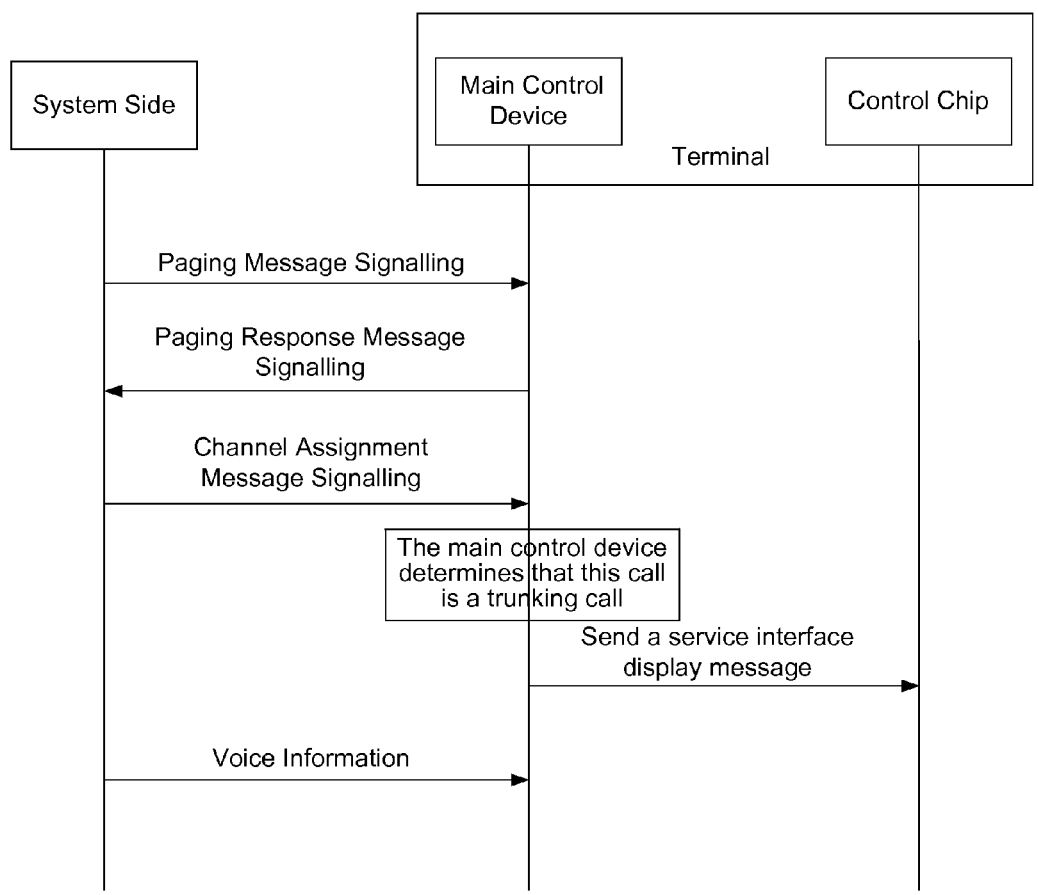
FIG. 3 is a schematic diagram showing the flow of a terminal answering a trunking call in the digital trunking communication system of the present invention.

FIG. 3 is a schematic diagram showing the flow of a terminal answering a trunking call in the digital trunking communication system of the present invention. As shown in FIG. 3, the terminal answer flow is that:

after receiving a paging message signalling from the system side, the main control device of the terminal returns a paging response message signalling to the system side; after receiving a channel assignment message signalling from the system side, the terminal determines the call type of this call according to the contents of the assignment mode (ASSIGN_MODE) field in the channel assignment message signalling, that is, determining the call is a normal voice call (original mode) or a trunking call; when the call is a normal voice call, the terminal adopts a voice mode flow which is the same as that in the prior art, thereby needing no further description; and when the call is a trunking call, the terminal considers that the user has responded this call by default, directly sends a service interface display message (i.e., +ZC-CNT: type), which includes the type of this call (a trunking call), to the control chip without querying the user about whether to respond, and informs the control chip to display the service interface, answer and play the voice information from the system side.

As sending a trunking call, the system side considers that the user answers by default, and directly sends a voice message to the terminal after sending a channel assignment message signalling; or when determining that the call is a trunking call, the terminal directly sends a user affirmative response message signalling to the system side which, after receiving the signalling, sends a voice message to the terminal.

Figure 4:
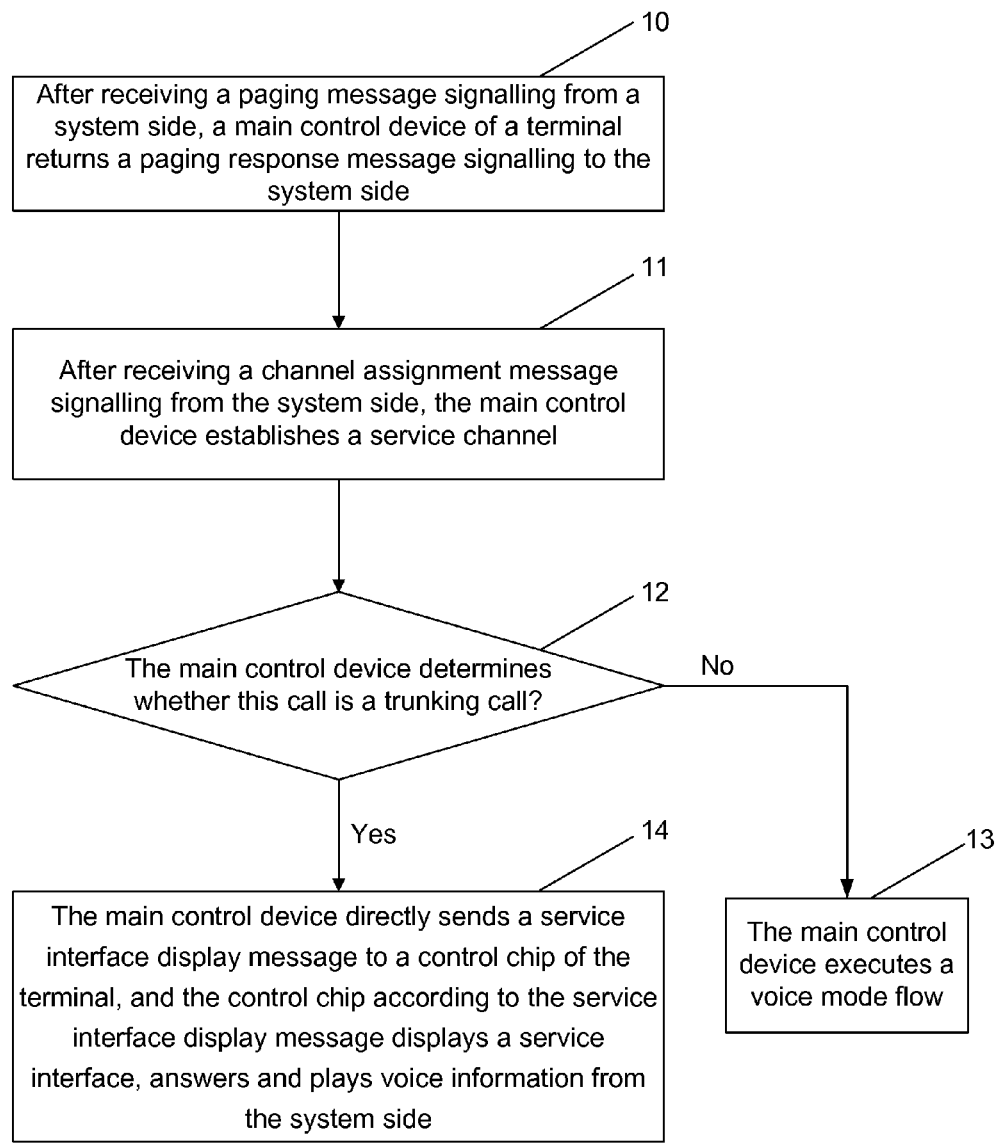
FIG. 4 is a schematic diagram showing the flow of a method for realizing a terminal fast answer in the digital trunking communication system of the present invention.

FIG. 4 is a schematic diagram showing the flow of a method for realizing a terminal fast answer in the digital trunking communication system of the present invention. As shown in FIG. 4, the method for realizing the terminal fast answer includes the following steps:

step 10: after receiving a paging message signalling from the system side, the main control device of the terminal returns a paging response message signalling to the system side;

step 11: after receiving a channel assignment message signalling from the system side, the main control device establishes a service channel;

step 12: the main control device determines whether this call is a trunking call; if the call is determined to be a trunking call, step 14 is executed; otherwise, step 13 is executed;

in this step, the main control device determines the call type of this call according to the contents of the ASSIGN_MODE field in the channel assignment message signalling; when the contents of the ASSIGN_MODE field are 100 or 110, this call is determines to be a trunking call; otherwise, this call is determined to be a normal voice call; in practical applications, the contents of the ASSIGN_MODE field are not limited to the above, and can be set in a predefined manner to distinguish the call type;

step 13: the main control device executes a voice mode flow;

in this step, the voice mode flow is existing technology, thereby needing no further description;

step 14: the main control device directly sends a service interface display message to the control chip of the terminal, and the control chip according to the service interface display message displays the service interface, answers and plays the voice information from the system side.

The present invention further provides a terminal in the digital trunking communication system for realizing the method of fast answer discussed above. The terminal comprises a main control device and a control chip.

The main control device is arranged to, after receiving a channel assignment message signalling from the system side, establish service channel, and send a service interface display message to the control chip when the call is a trunking call; and the control chip is arranged to, according to the service interface display message, display the service interface, answer and play the voice information from the system side.

In the process of a trunking call, by changing and optimizing the interactive mode in the process of communication between the main control device and the control chip of the terminal in the digital trunking communication system, the present invention reduces the AT transmission information (omitting operations such as ring) between the main control device and the control chip, from original three to one AT transmission information, reduces the processing difficulty of the control chip, meets the requirements of the trunking system better, thereby being more adapted to the answer fast access and display of the terminal in the digital trunking system and meeting the requirements of the digital trunking user better.

What is discussed above are only preferred embodiments of the present invention, and not intended to limit the protection scope of the present invention.

What is claimed is:

1. A method for fast answering a trunking call in a digital trunking communication system, comprising:
   establishing, by a main control device of the terminal, a service channel after receiving a channel assignment message signalling from a system side;
   determining, by the main control device, whether a call from the system side is a trunking call or not;
   sending, by the main control device, directly a service interface display message to a control chip of the terminal when determining that the call is a trunking call; and
   displaying, by the control chip, a service interface according to the service interface display message, answering the call, and playing voice messages sent by the system side.

2. The method of claim 1, wherein the main control device determines whether a call from the system side is a trunking call or not according to contents of an assignment mode field in the channel assignment message signalling.

3. The method of claim 1, wherein the terminal is a mobile phone or a vehicle mounted radio station.

4. A terminal in a digital trunking communication system, comprising a main control device and a control chip, wherein:
   the main control device is configured to:
      establish a service channel after receiving a channel assignment message signalling from a system side;
      determine whether a call from the system side is a trunking call or not; and
      send directly a service interface display message to the control chip of the terminal when determining that the call is a trunking call; and
   the control chip is configured to display a service interface according to the service interface display message, answer the call, and play voice messages sent by the system side.

5. The terminal of claim 4, wherein the terminal is a mobile phone or a vehicle mounted radio station.

6. The method of claim 2, wherein the terminal is a mobile phone or a vehicle mounted radio station.

* * * * *